(12) United States Patent
Denifl et al.

(10) Patent No.: US 8,207,271 B2
(45) Date of Patent: *Jun. 26, 2012

(54) PROCESS FOR THE MANUFACTURE OF HETEROPHASIC PROPYLENE COPOLYMER

(75) Inventors: Peter Denifl, Helsinki (FI); Timo Leinonen, Tolkkinen (FI); Anssi Haikarainen, Tuusula (FI); Torvald Vestberg, Porvoo (FI)

(73) Assignee: Borealis Technology Oy, Porvoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 12/734,741

(22) PCT Filed: Nov. 26, 2008

(86) PCT No.: PCT/EP2008/066269
§ 371 (c)(1),
(2), (4) Date: May 20, 2010

(87) PCT Pub. No.: WO2009/068581
PCT Pub. Date: Jun. 4, 2009

(65) Prior Publication Data
US 2010/0240836 A1 Sep. 23, 2010

(30) Foreign Application Priority Data
Nov. 30, 2007 (EP) .................... 07122047

(51) Int. Cl.
C08L 23/00 (2006.01)
C08F 4/00 (2006.01)
C08F 210/00 (2006.01)
B01J 31/00 (2006.01)
B01J 37/00 (2006.01)

(52) U.S. Cl. ........... 525/240; 526/348; 526/90; 502/127
(58) Field of Classification Search ................. 525/240; 526/348, 90; 502/127
See application file for complete search history.

(56) References Cited

FOREIGN PATENT DOCUMENTS

| EP | 1 598 377 A1 | * 11/2005 |
|---|---|---|
| EP | 2 065 405 A1 | 6/2009 |
| WO | WO 03/000754 A1 | 1/2003 |
| WO | WO 03/000757 A1 | 1/2003 |
| WO | WO 2004/029112 A1 | 4/2004 |
| WO | WO 2005/113613 A1 | 12/2005 |
| WO | WO 2007/077027 A1 | 7/2007 |

OTHER PUBLICATIONS

Bravo-Suarez et al.; Review of the Synthesis of Layered Double Hydroxides: A Thermodynamic Approach; Quim. Nova; 2004; vol. 27, No. 4; pp. 601-614.

* cited by examiner

*Primary Examiner* — William Cheung
(74) *Attorney, Agent, or Firm* — Warn Partners, P.C.

(57) ABSTRACT

The invention is directed to a process for the manufacture of heterophasic propylene copolymer compositions comprising the steps of forming a propylene polymer matrix in at least one slurry reactor and optionally in at least one gas phase reactor and subsequently forming in at least one gas phase reactor an elastomeric copolymer by copolymerizing propylene with ethylene and/or with another alpha-olefin in the presence of said matrix, wherein the polymerization is carried out in the presence of a catalyst system comprising a catalyst in form of solid particles, said particles (a) have a surface area of less than 20 $m^2/g$, (b) comprise a transition metal compound of groups 4 to 10 of the periodic table or a compound of actinide or lanthanide, (c) comprise a metal compound of groups 1 to 3 of the periodic table, and (d) comprise inclusions not comprising catalytically active sites.

29 Claims, 2 Drawing Sheets

Flowability was measured by letting 90 g of polymer powder flow through a funnel. The time it takes for the sample to flow through is a measurement of stickiness.

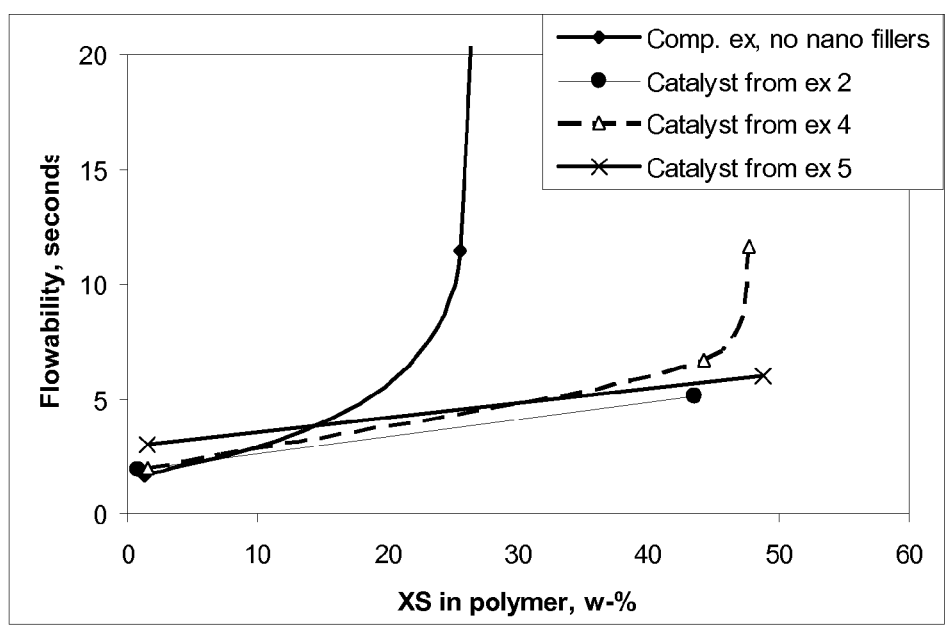
Figure 1: Flowability was measured by letting 90 g of polymer powder flow through a funnel. The time it takes for the sample to flow through is a measurement of stickiness.

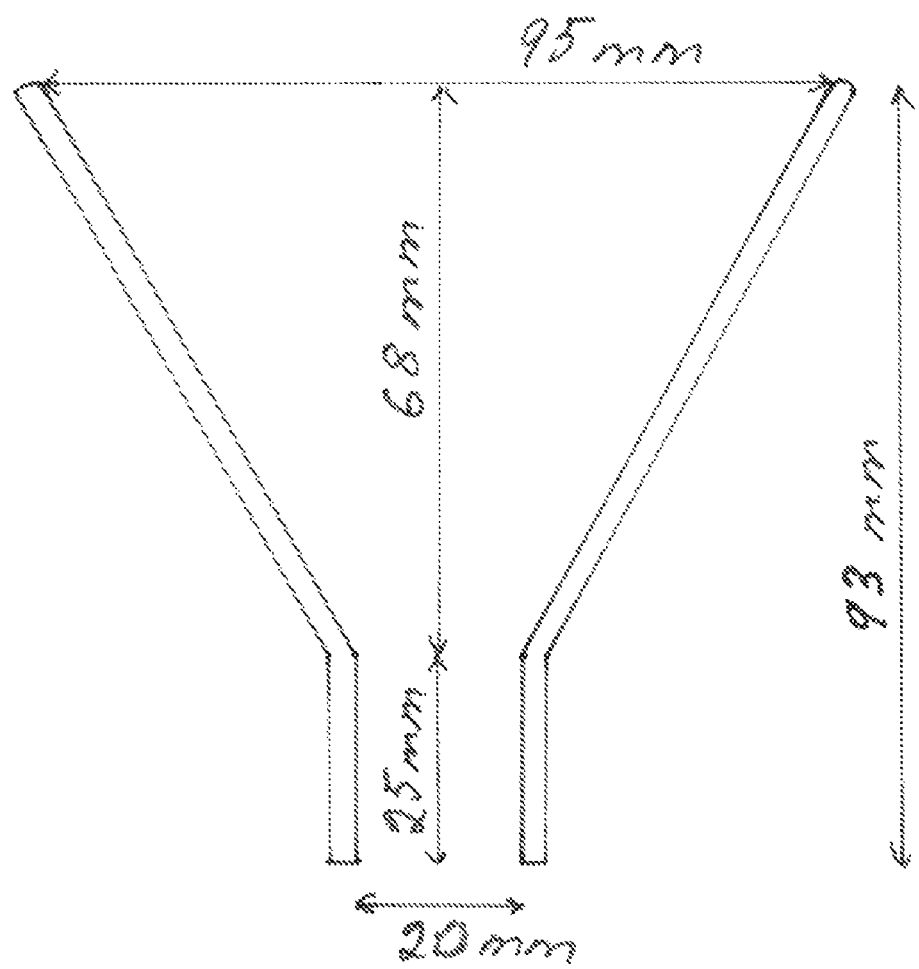
Figure 2: Funnel for the flowability test

PROCESS FOR THE MANUFACTURE OF HETEROPHASIC PROPYLENE COPOLYMER

This application is a National Stage of International Application No. PCT/EP2008/066269, filed Nov. 26, 2008. This application claims priority to European Patent Application No. 07122047.9 filed on Nov. 30, 2007. The disclosures of the above applications are incorporated herein by reference.

The present invention relates to a new process for the manufacture of heterophasic propylene copolymer as well as the use of a specific catalyst Ziegler-Natta catalyst system in said process.

It is known that polypropylene polymers have suitable resistance to heat and chemicals as well as have attractive mechanical properties. Further, it is known that desired properties, e. g. stiffness and impact strength properties of polypropylene can be achieved by copolymerizing propylene with ethylene and/or other α-olefin monomers and optionally by adding elastomeric components to the polymer matrix.

Polypropylene copolymers can thus be used as alternatives, e.g. for poly(vinylchloride) (PVC). Further, polypropylene polymers are very suitable in wide range of applications.

However wherever rather soft and flexible materials are desired polypropylene compositions have been up to now not able to replace the polyvinyl chloride counterparts successfully as soft products are in commercial scale-up not producible. It is for instance known that heterophasic polypropylene systems, i.e. systems obtained in an at least two stage process resulting in a multiphase structure comprising a propylene matrix and inclusions therein comprising elastomeric phase (or so called rubber phase), can be tailored by setting the comonomer content in the matrix and in the elastomeric phase respectively for different purposes desired. For instance with increase of the elastomeric phase, like the ethylene-propylene rubber phase, within the matrix of the heterophasic polypropylene systems the toughness of the same can be improved. However there are limits set by the processes employed for the manufacture of heterophasic polypropylene systems with regard to the amount of the elastomeric phase. For instance too high amounts of elastomeric phase in the heterophasic polypropylene system cause serious problems in the reactions vessels or impede the transfer of the obtained product in the transfer lines due to stickiness problems.

It is presumed that the stickiness of the heterophasic polypropylene systems is caused by elastomeric material which migrates to the surface of the matrix of the heterophasic propylene system. This phenomenon occurs in particular in case the amount of the elastomeric phase exceeds the pore volume of the matrix. Also an uneven dispersion of the elastomeric phase within the matrix of the heterophasic propylene system may contribute to stickiness problems. With conventional Ziegler-Natta catalyst systems, i.e. with catalysts being externally supported, it is to date not possible to produce non-sticky heterophasic polypropylene systems with rather high amount of the elastomeric phase, as the use of such catalyst types lead to heterophasic polypropylene systems having a matrix of rather high porosity.

In WO 2005/113613 heterophasic polypropylene is produced with a new generation of Ziegler-Natta type catalysts, i.e. catalysts of solid particles in spherical shape and being without external support. Such catalysts enable to produce heterophasic polypropylene in which the elastomeric phase is well dispersed and due to the non-porous character of the catalyst also the obtained heterophasic polypropylene is featured by rather high bulk density (replication effect). However the catalyst is unsuitable to produce a heterophasic polypropylene with rather high amounts of elastomeric material. Moreover even though the stickiness of the heterophasic polypropylene is slightly reduced compared to products obtained by conventional processes a further improvement is still desirable.

WO 2007/077027 addresses mainly a modification of the above mentioned class of new Ziegler-Natta catalysts. Accordingly the catalysts of solid particles in spherical shape and being without external support are further featured by inclusion having no catalytic activity. Along the way it is reported that propylene homopolymers can be produced having hollow voids. However nothing is reported as to how the stickiness problems in the manufacture of heterophasic propylene copolymer can one get under control.

In view of the sate of the art it is an object of the present invention to provide a more efficient process for the manufacture of heterophasic material, for instance in terms of high throughput. It is in particular an object of the present invention to provide a process which causes reduced reactor fouling due to sticky precipitates. Thus it is in particular sought for a process which enables to produce an heterophasic material which is less sticky compared to similar material (similar elastomeric content, comonomer content, MFR, etc). Accordingly it is desirable that the new process can be applied for broad range of different heterophasic polypropylene materials, in particular in terms of a broad range of different amounts of elatomeric material within the matrix of the heterophasic polypropylene. Therefore the new process shall be in particular suitable to produce a heterophasic propylene copolymer with an elastomeric content of at least 30 wt.-% and being not sticky.

The finding of the present invention is that the process must enable the manufacture of a heterophasic propylene copolymer wherein the matrix has an essentially non-porous surface which impede the migration of the elastomeric material from the interior of the matrix to the surface.

Accordingly the present invention is directed to a process for the manufacture of heterophasic propylene copolymer compositions comprising the steps of (a) in a first stage, forming a propylene polymer matrix in at least one slurry reactor and optionally in at least one gas phase reactor, (b) in a second stage, forming in at least one gas phase reactor, an elastomeric propylene copolymer by copolymerizing propylene with ethylene and/or with another α-olefin in the presence of said matrix, wherein at least in the first stage, the polymerization is carried out in the presence of a catalyst system comprising a catalyst in form of solid particles, said particles (i) have a surface area of less than 20 $m^2/g$, (ii) comprise a transition metal compound which is selected from one of the groups 4 to 10 of the periodic table (IUPAC) or a compound of actinide or lanthanide, (iii) comprise a metal compound which is selected from one of the groups 1 to 3 of the periodic table (IUPAC), and (iv) comprise inclusions not comprising catalytically active sites.

Preferably the inclusions are free from transition metal compounds which are selected from one of the groups 4 to 10 of the periodic table and free from compounds of actinide or lanthanide. Accordingly it can be also said, that the solid particles comprise inclusions being free from transition metal compounds which are selected from one of the groups 4 to 10 of the periodic table and free from compounds of actinide or lanthanide.

Preferably the matrix is a propylene homopolymer or a propylene (random) copolymer.

In alternative embodiment the process for the manufacture of heterophasic propylene copolymer compositions is defined by comprising the steps of
(a) in a first stage, forming a propylene polymer matrix in at least one slurry reactor and optionally in at least one gas phase reactor,
(b) in a second stage, forming in at least one gas phase reactor an elastomeric propylene copolymer by copolymerizing propylene with ethylene and/or with another α-olefin in the presence of said matrix,
wherein at least in the first stage, the polymerization is carried out in the presence of a catalyst system comprising a catalyst in form of solid particles, said particles
(i) have a surface area of less than 20 $m^2/g$,
(ii) comprise
(α) a transition metal compound which is selected from one of the groups 4 to 10 of the periodic table (IUPAC) or a compound of actinide or lanthanide, and
(β) a metal compound which is selected from one of the groups 1 to 3 of the periodic table (IUPAC),
wherein the transition metal compound (or the compound of actinide or lanthanide) (i) with the metal compound (ii) constitutes the active sites of said particles, and
(iii) comprise inclusions not comprising catalytically active sites.

Preferably the inclusions are free from transition metal compounds which are selected from one of the groups 4 to 10 of the periodic table and free from compounds of actinide or lanthanide. Accordingly it can be also said, that the solid particles comprise inclusions being free from transition metal compounds which are selected from one of the groups 4 to 10 of the periodic table and free from compounds of actinide or lanthanide.

Preferably the matrix is a propylene homopolymer or a propylene (random) copolymer.

Surprisingly it has been found out that with the above defined processes the preparation of heterophasic propylene copolymers in a very efficient manner is possible. In particular the inventive processes allow the manufacture of heterophasic propylene copolymers having a rather high elastomeric propylene copolymer content dispersed within the propylene polymer matrix. For instance with the inventive process heterophasic propylene copolymers are obtainable having an elastomeric propylene copolymer content far above 30 wt.-% and being not sticky (see table 3 and 4). The used catalyst particles are in particular featured by very low surface area which indicates that the surface of the catalyst particles is essentially free of pores penetrating the interior of the particles. On the other hand, the catalyst particles have inclusions which however do not extend to the surface area of the particles dispersed therein. Because of the "replication effect", the polymer matrix particles produced with such a catalyst show an internal pore structure, which however does not extend to the surface. In other words the matrix of the heterophasic propylene copolymer has internal pores or cavities which have no connection to the surface of the matrix. These internal pores or cavities are able to accumulate the elastomeric propylene copolymer produced in the second stage.

Accordingly the advantage of the inventive process compared to a conventional process employing a known porous catalyst is that the pores or cavities of the catalyst particles employed in the instant invention are not open to the surface and thus also the migration of the elastomeric propylene copolymer to the surface of the propylene polymer matrix is hindered. In addition, and because of an even distribution of the pores or cavities within the propylene polymer matrix, it is possible to distribute the elastomeric propylene copolymer very evenly within the whole polymer particle. This allows avoiding the formation of a concentration gradient within the polymer particle. Also the presence of isolated areas with a high elastomeric propylene copolymer concentration due to crack formation inside the polymer particle during the polymerization is minimized.

BRIEF DESCRIPTION OF THE DRAWINGS

FIG. 1 is a chart depicting the flowabilty measured by letting 90 g of polymer powder flow through a funnel, wherein the time it takes for the sample to flow through is a measurement of stickiness; and FIG. 2 depicts a funnel for a flowability test.

In the following the invention as defined in the two embodiments as stated above is further specified.

One essential aspect of the present invention is that the heterophasic propylene copolymer is produced in the presence of a specific catalyst system.

Accordingly a catalyst in the form of solid particles is required. These particles are typically of spherical shape, although the present invention is not limited to a spherical shape. The solid particles in accordance with the present invention also may be present in round but not spherical shapes, such as elongated particles, or they may be of irregular size. Preferred in accordance with the present invention, however, are particles having a spherical shape.

A further essential aspect of the present invention is that the catalyst particles are essentially free of pores or cavities having access to the surface. In other words the catalyst particles might have hollow voids, like pores or cavities, however such voids are not open to the surface.

Conventional Ziegler-Natta catalysts are supported on external support material. Such material has a high porosity and high surface area meaning that its pores or cavities are open to its surface. Such kind of supported catalyst may have a high activity, however a drawback of such type of catalysts is that it tends to produce sticky material in particular when high amounts of comonomer is used in the polymerization process.

Therefore it is appreciated that the catalyst as defined herein is free from external support material and has a rather low to very low surface area. A low surface area is insofar appreciated as therewith the bulk density of the produced polymer can be increased enabling a high throughput of material. Moreover a low surface area also reduces the risk that the solid catalyst particle has pores extending from the interior of the particle to the surface. Typically the catalyst particle has a surface area measured according to the commonly known BET method with $N_2$ gas as analysis adsorptive of less than 20 $m^2/g$, more preferably of less than 15 $m^2/g$, yet more preferably of less than 10 $m^2/g$. In some embodiments, the solid catalyst particle in accordance with the present invention shows a surface area of 5 $m^2/g$ or less.

The catalyst particle can be additionally defined by the pore volume. Thus it is appreciated that the catalyst particle has a porosity of less than 1.0 ml/g, more preferably of less than 0.5 ml/g, still more preferably of less than 0.3 ml/g and even less than 0.2 ml/g. In another preferred embodiment the porosity is not detectable when determined with the method applied as defined in the example section.

The solid catalyst particle in accordance with the present invention furthermore shows preferably a predetermined particle size. Typically, the solid particles in accordance with the present invention show uniform morphology and often a narrow particle size distribution.

Moreover the solid catalyst particles in accordance with the present invention typically have a mean particle size of not more than 500 μm, i.e. from 1 to 500 μm, for example 5 to 500 μm. Preferred embodiments of the present invention are solid particles having a mean particle size range of from 5 to 200 μm or from 10 to 150 μm. Smaller mean particle size ranges, however, are also suitable, such as from 5 to 100 μm. Alternative embodiments are larger mean particle size ranges, for example from 20 to 250 μm. However for the present process in particular catalyst particles with a mean particle size range from 20 to 60 μm is preferred. These mean particle size ranges of the solid particles in accordance with the present invention may be obtained as explained further below in connection with the method of preparing the solid particles.

The employed catalyst particles comprise of course one or more catalytic active components. These catalytic active components constitute the catalytically active sites of the catalyst particles. As explained in detail below the catalytic active components, i.e. the catalytically active sites are distributed within the part of the catalyst particles not forming the inclusions. Preferably they are evenly distributed in that part.

Active components according to this invention are, in addition to the transition metal compound which is selected from one of the groups 4 to 10 of the periodic table (IUPAC) or a compound of actinide or lanthanide and the metal compound which is selected from one of the groups 1 to 3 of the periodic table (IUPAC) (see above and below), also aluminium compounds, additional transition metal compounds, and/or any reaction product(s) of a transition compound(s) with group 1 to 3 metal compounds and aluminium compounds. Thus the catalyst may be formed in situ from the catalyst components, for example in solution in a manner known in the art.

The catalyst in solution (liquid) form can be converted to solid particles by forming an emulsion of said liquid catalyst phase in a continuous phase, where the catalyst phase forms the dispersed phase in the form of droplets. By solidifying the droplets, solid catalyst particles are formed.

It should also be understood that the catalyst particle prepared according to the invention may be used in a polymerisation process together with cocatalysts to form an active catalyst system, which further may comprise e.g. external donors etc. Furthermore, said catalyst of the invention may be part of a further catalyst system. These alternatives are within the knowledge of a skilled person.

As stated above the catalyst particles comprise
(a) a transition metal compound which is selected from one of the groups 4 to 10, preferably titanium, of the periodic table (IUPAC) or a compound of an actinide or lanthanide,
(b) a metal compound which is selected from one of the groups 1 to 3 of the periodic table (IUPAC), preferably magnesium,
(c) optionally an electron donor compound, and
(d) optionally an aluminium compound.

Suitable catalyst compounds and compositions and reaction conditions for forming such a catalyst particle is in particular disclosed in WO 03/000754, WO 03/000757, WO 2004/029112 and WO 2007/077027, all four documents are incorporated herein by reference.

Suitable transition metal compounds are in particular transition metal compounds of transition metals of groups 4 to 6, in particular of group 4, of the periodic table (IUPAC). Suitable examples include Ti, Fe, Co, Ni, Pt, and/or Pd, but also Cr, Zr, Ta, and Th, in particular preferred is Ti, like TiCl$_4$. Of the metal compounds of groups 1 to 3 of the periodic table (IUPAC) preferred are compounds of group 2 elements, in particular Mg compounds, such as Mg halides, Mg alkoxides etc. as known to the skilled person.

In particular a Ziegler-Natta catalyst (preferably the transition metal is titanium and the metal is magnesium) is employed, for instance as described in WO 03/000754, WO 03/000757, WO 2004/029112 and WO 2007/077027.

As the electron donor compound any donors known in the art can be used, however, the donor is preferably a mono- or diester of an aromatic carboxylic acid or diacid, the latter being able to form a chelate-like structured complex. Said aromatic carboxylic acid ester or diester can be formed in situ by reaction of an aromatic carboxylic acid chloride or diacid dichloride with a C2-C16 alkanol and/or diol, and is preferable dioctyl phthalate.

The aluminium compound is preferably a compound having the formula (I)

$$AlR_{3-n}X_n \quad (I)$$

wherein

R stands for a straight chain or branched alkyl or alkoxy group having 1 to 20, preferably 1 to 10 and more preferably 1 to 6 carbon atoms, X stands for halogen, preferably chlorine, bromine or iodine, especially chlorine and n stands for 0, 1, 2 or 3, preferably 0 or 1.

Preferably alkyl groups having from 1 to 6 carbon atoms and being straight chain alkyl groups, such as methyl, ethyl, propyl, butyl, pentyl or hexyl, preferably methyl, ethyl, propyl and/or butyl.

Illustrative examples of aluminium compounds to be employed in accordance with the present invention are diethyl aluminium ethoxide, ethyl aluminium diethoxide, diethyl aluminium methoxide, diethyl aluminium propoxide, diethyl aluminium butoxide, dichloro aluminium ethoxide, chloro aluminium diethoxide, dimethyl aluminium ethoxide.

Other suitable examples for the above defined aluminium compounds are tri-(C1-C6)-alkyl aluminium compounds, like triethyl aluminium, tri iso-butyl aluminium, or an alkyl aluminium compound bearing one to three halogen atoms, like chlorine. In particular preferred is triethylaluminium, diethylaluminium chloride and diethyl aluminium ethoxide.

As mentioned above catalyst systems may include in addition to the solid catalyst particles cocatalysts and/ external donor(s) in a manner known in the art.

As the conventional cocatalyst, e.g. those based on compounds of group 13 of the periodic table (IUPAC), e.g. organo aluminium, such as aluminium compounds, like aluminium alkyl, aluminium halide or aluminium alkyl halide compounds (e.g. triethylaluminium) compounds, can be mentioned. Additionally one or more external donors can be used which may be typically selected e.g. from silanes or any other well known external donors in the field. External donors are known in the art and are used as stereoregulating agent in propylene polymerisation. The external donors are preferably selected from hydrocarbyloxy silane compounds and hydrocarbyloxy alkane compounds.

Typical hydrocarbyloxy silane compounds have the formula (II)

$$R'_oSi(OR'')_{4-o} \quad (II)$$

wherein

R' is an α- or β-branched $C_3$-$C_{12}$-hydrocarbyl,

R'' a $C_1$-$C_{12}$-hydrocarbyl, and o is an integer 1-3.

More specific examples of the hydrocarbyloxy silane compounds which are useful as external electron donors in the invention are diphenyldimethoxy silane, dicyclopentyldimethoxy silane, dicyclopentyldiethoxy silane, cyclopentylmethyldimethoxy silane, cyclopentylmethyldiethoxy silane, dicyclohexyldimethoxy silane, dicyclohexyldiethoxy silane, cyclohexylmethyldimethoxy silane, cyclohexylmethyldiethoxy silane, methylphenyldimethoxy silane, diphenyldiethoxy silane, cyclopentyltrimethoxy silane, phenyltrimethoxy silane, cyclopentyltriethoxy silane, phenyltriethoxy silane. Most preferably, the alkoxy silane compound having the formula (3) is dicyclopentyl dimethoxy silane or cyclohexylmethyl dimethoxy silane.

It is also possible to include other catalyst component(s) than said catalyst components to the catalyst of the invention.

The solid catalyst particle as defined in the instant invention is furthermore preferably characterized in that it comprises the catalytically active sites distributed throughout the solid catalyst particle, however not in those parts comprising inclusions as defined above. In accordance with the present invention, this definition means that the catalytically active sites are evenly distributed throughout the catalyst particles, preferably that the catalytically active sites make up a substantial portion of the solid catalyst particles in accordance with the present invention. In accordance with embodiments of the present invention, this definition means that the catalytically active components, i.e. the catalyst components, make up the major part of the catalyst particle.

A further requirement of the present invention is that the solid catalyst particles comprise inclusions not comprising catalytically active sites. Alternatively or additionally the inclusions can be defined as inclusions being free of transition metals of groups 4 to 6, in particular of group 4, like Ti, of the periodic table (IUPAC) and being free of a compound of actinide or lanthanide. In other words the inclusions do not comprise the catalytic active materials as defined under (b) of claim 1, i.e. do not comprise such compounds or elements, which are used to establish catalytically active sites. Thus in case the solid catalyst particle comprise compounds of any one of transition metals of groups 4 to 6, in particular of group 4, like Ti, of the periodic table (IUPAC) or a compound of actinide or lanthanide these are then not present in the inclusions.

Such inclusions are preferably (evenly) dispersed within the catalyst particles. Accordingly the solid catalyst particle can be seen also as a matrix in which the inclusions are dispersed, i.e. form a dispersed phase within the matrix phase of the catalyst particle. The matrix is then constituted by the catalytically active components as defined above, in particular by the transition metal compounds of groups 4 to 10 of the periodic table (IUPAC) (or a compound of actinide or lanthanide) and the metal compounds of groups 1 to 3 of the periodic table (IUPAC). Of course all the other catalytic compounds as defined in the instant invention can additionally constitute to the matrix of the catalyst particles in which the inclusions are dispersed.

The inclusions usually constitute only a minor part of the total volume of the solid catalyst particles, i.e. typically below 50 vol.-%, more preferably lower than 40 vol.-% and, in particular 30 vol.-% or lower, 20 vol.-% or lower and in embodiments even 10 vol.-% or lower. A suitable range is from 8 to 30 vol.-%, more preferably 10 to 25 vol.-%.

In case the inclusions are solid material it is in particular preferred that the solid catalyst particle comprise up to 30 wt.-% solid material, more preferably up to 20 wt.-%. It is in particular preferred that the solid catalyst particle comprise inclusions being solid material in the range of 1 to 30 wt.-%, more preferably in the range of 1 to 20 wt.-% and yet more preferably in the range of 1 to 10 wt.-%.

The inclusions may be of any desired shape, including spherical as well as elongated shapes and irregular shapes. Inclusions in accordance with the present invention may have a plate-like shape or they may be long and narrow, for example in the shape of a fiber. Irregular shapes of all kind are also envisaged by the present invention. Typical inclusions, however, are either spherical or near spherical or they show plate-like shapes. Preferably the inclusions have a spherical or at least near spherical shape. It is to be noted that the inclusions are inside the catalyst particles, but essentially not extending to the surface of the particles. Thus the inclusions are not open to the surface of the catalyst particles.

The inclusions in accordance with the present invention, not comprising catalytically active sites, may be present in the form of solid material, liquids, hollow voids, optionally partially filled with a liquid and/or a solid material, or any combination thereof. It is in particular preferred that the inclusions are solid material and/or hollow voids partially filled with solid material. In a preferred embodiment the inclusions are solid material only. In particular, in the case of using solid materials, the shape of the inclusions can be determined on the basis of the shape of the solid material, or particles of solid material employed. The shape of liquids, hollow voids and hollow voids partially filled with liquid are typically determined by the process conditions during the preparation of the solid particles, as further outlined in detail below.

Typical examples of solid materials suitable for forming inclusions in accordance with the present invention are inorganic materials as well as organic, in particular organic polymeric materials, suitable examples being nano-materials, such as silica, montmorillonite, carbon black, graphite, zeolites, alumina as well as other inorganic particles, including glass nano-beads or any combination thereof. Suitable organic particles, in particular polymeric organic particles, are nano-beads made from polymers such as polystyrene, or other polymeric materials. In any case, the particulate materials employed for providing inclusions in the solid catalyst particles have to be inert towards the catalytically active sites, during the preparation of the solid catalyst particles as well as during the subsequent use in polymerization reactions. This means that the solid material is not to be interfered in the formation of active centres. The solid materials used for providing inclusions in accordance with the present invention preferably themselves have a low surface area and are more preferably non-porous.

Thus, for instance the solid material used in the present invention cannot be a magnesium-aluminum-hydroxy-carbonate. This material belongs to a group of minerals called layered double hydroxide minerals (LDHs), which according to a general definition are a broad class of inorganic lamellar compounds of basic character with high capacity for anion intercalation (Quim. Nova, Vol. 27, No. 4, 601-614, 2004). This kind of materials are not suitable to be used in the invention due to the reactivity of the OH— groups included in the material, i.e. OH groups can react with the TiCl4 which is part of the active sites. This kind of reaction is the reason for a decrease in activity, and increased amount of xylene solubles.

Accordingly it is particular preferred that the solid material is selected form spherical particles of nano-scale consisting of $SiO_2$, polymeric materials and/or $Al_2O_3$. By nano-scale according to this invention is understood that the solid material has a mean particle size of below 100 nm, more preferred below 90 nm.

It has been in particular discovered that rather high amounts of elastomeric propylene copolymer can be incorporated in the propylene polymer matrix of the heterophasic propylene copolymer without getting sticky in case the surface area and/or the porosity of the solid material used is(are) rather low.

Thus the catalyst particles of the present invention shall in particular comprise, preferably only comprise, inclusions being solid materials having a surface area below 500 m$^2$/g, more preferably below 300 m$^2$/g, yet more preferably below 200 m$^2$/g, still more preferably below 100 m$^2$/g.

Liquids, hollow voids and hollow voids partially filled with liquid may in particular be introduced into the solid catalyst particles by using inert liquids, which preferably are immiscible with the liquids and solvents used during the preparation of the solid catalyst particles in accordance with the invention. These liquids furthermore may display a different viscosity, compared with the liquids employed during the catalyst particle preparation as solvents and/or reaction medium. Suitable examples thereof are silicon oils, perfluorinated hydrocarbons, such as hydrocarbons having from 6 to 20 carbon atoms, preferably 7 to 14 carbon atoms, with a particularly preferred example being perfluoro octane. Other inert and immiscible liquids may be also employed, including partially fluorinated hydrocarbons, perfluorinated ethers (including polyethers) and partially fluorinated ethers, as long as these liquids are inert towards the catalyst component and provide inclusions in accordance with the present invention.

Preferably, such liquids are employed in combination with a suitable surfactant, which stabilizes the inclusions during the preparation of the solid particles. For example, surfactants, e.g. surfactants based on hydrocarbons (including polymeric hydrocarbons with a molecular weight e.g. up to 10000, optionally interrupted with a heteroatom(s)), preferably halogenated hydrocarbons, such as semi-, or highly-fluorinated hydrocarbons optionally having a functional group, or, preferably semi-, highly- or perfluorinated hydrocarbons having a functionalised terminal, can be used. Surfactants can also be formed by reacting a surfactant precursor bearing at least one functional group with a compound being part of the catalyst solution or solvent and being reactive with said functional group. Examples of the surfactant precursors include e.g. known surfactants which bear at least one functional group selected e.g. from —OH, —SH, —NH$_2$, —COOH, —COONH$_2$, oxides of alkenes, oxo-groups and/or any reactive derivative of these groups, e.g. semi-, highly or perfluorinated hydrocarbons bearing one or more of said functional groups.

The inclusions of the catalyst particles typically have a size in the range of 100 nm (widest diameter), although the size is not restricted to this specific value. The present invention also contemplates inclusions having mean particle sizes of from 20 to 500 nm, with mean particle sizes of from 20 to 400, and in particular from 20 to 200 nm being preferred. In particular mean particle sizes from 30 to 100 nm are preferred. The mean particle sizes of liquids, hollow voids partially liquid filled hollow voids may, in particular, be controlled during the preparation of solid particles. The mean particle size of the inclusions may be controlled by the size of the solid material employed for the provision of inclusions, as outlined above, in connection with the control of the shape of the inclusions.

It is in particular preferred that the inclusions are solid material and more preferably that the inclusions are solid material having mean particle sizes of below 100 nm, like below 90 nm, more preferably from 10 to 90 nm, yet more preferably from 10 to 70 nm.

It should be noted that it is also an essential feature that the inclusions, in particular the solid material, has small mean particle size, i.e. below 200 nm, preferably below 100 nm, as indicated above. Thus, many materials having bigger particle size, e.g. from several hundreds of nm to μm scale, even if chemically suitable to be used in the present invention, are not the material to be used in the present invention. Such bigger particle size materials are used in catalyst preparation e.g. as traditional external support material as is known in the art. One drawback in using such kind of material in catalyst preparation, especially in final product point of view, is that this type of material leads easily to inhomogeneous material and formation of gels, which might be very detrimental in some end application areas, like in film and fibre production.

Preferably the catalyst particles of the present invention are obtained by preparing a solution of one or more catalyst components, dispersing said solution in a solvent, so that the catalyst solution forms a dispersed phase in the continuous solvent phase, and solidifying the catalyst phase to obtain the catalyst particles of the present invention. The inclusions in accordance with the present invention may be introduced by appropriately admixing said agent for forming the inclusions with the catalyst solution, during the preparation thereof or after formation of the catalyst phase, i.e. at any stage before solidification of the catalyst droplets.

Accordingly in one aspect the catalyst particles are obtainable by a process comprising the steps of (a) contacting the catalyst components as defined above, i.e. a metal compound which is selected from one of the groups 1 to 3 of the periodic table (IUPAC) with a transition metal compound which is selected from one of the groups 4 to 10 of the periodic table (IUPAC) or a compound of an actinide or lanthanide, to form a reaction product in the presence of a solvent, leading to the formation of a liquid/liquid two-phase system comprising a catalyst phase and a solvent phase, (b) separating the two phases and adding an agent for generating said inclusions not comprising catalytically active sites to the catalyst phase, (c) forming a finely dispersed mixture of said agent and said catalyst phase, (d) adding the solvent phase to the finely dispersed mixture, (e) forming an emulsion of the finely dispersed mixture in the solvent phase, wherein the solvent phase represents the continuous phase and the finely dispersed mixture forms the dispersed phase, and (f) solidifying the dispersed phase.

In another embodiment the catalyst particles are obtainable by a process comprising the steps of (a) contacting, in the presence of an agent for generating the inclusions not comprising catalytically active sites, the catalyst components as defined above, i.e. a metal compound which is selected from one of the groups 1 to 3 of the periodic table (IUPAC) with a transition metal compound which is selected from one of the groups 4 to 10 of the periodic table (IUPAC) or a compound of an actinide or lanthanide, to form a reaction product in the presence of a solvent, leading to the formation of a liquid/liquid two-phase system comprising a catalyst phase and a solvent phase, (b) forming an emulsion comprising a catalyst phase comprising said agent and a solvent phase, wherein the solvent phase represents the continuous phase and the catalyst phase forms the dispersed phase, and (c) solidifying the dispersed phase Additional catalyst components, like compounds of group 13 metal, as described above, can be added at any step before the final recovery of the solid catalyst. Further, during the preparation, any agents enhancing the emulsion formation can be added. As examples can be mentioned emulsifying agents or emulsion stabilisers e.g. surfactants, like acrylic or metacrylic polymer solutions and turbulence minimizing agents, like alpha-olefin polymers without polar groups, like polymers of alpha olefins of 6 to 20 carbon atoms.

Suitable processes for mixing include the use of mechanical as well as the use of ultrasound for mixing, as known to the skilled person. The process parameters, such as time of mixing, intensity of mixing, type of mixing, power employed for mixing, such as mixer velocity or wavelength of ultrasound employed, viscosity of solvent phase, additives employed, such as surfactants, etc. are used for adjusting the size of the catalyst particles as well as the size, shape, amount and distribution of the inclusions within the catalyst particles.

Particularly suitable methods for preparing the catalyst particles of the present invention are outlined below.

The catalyst solution or phase may be prepared in any suitable manner, for example by reacting the various catalyst precursor compounds in a suitable solvent. In one embodiment this reaction is carried out in an aromatic solvent, preferably toluene, so that the catalyst phase is formed in situ and separates from the solvent phase. These two phases may then be separated and an agent for forming the inclusions may be added to the catalyst phase. After subjecting this mixture of catalyst phase and agent for providing the inclusions to a suitable dispersion process, for example by mechanical mixing or application of ultrasound, in order to prepare a dispersion of the inclusion providing agent in the catalyst phase, this mixture (which may be a dispersion of solid inclusion providing agent in the catalyst phase forming a microsuspension or a microemulsion of droplets of a liquid inclusion providing agent in the catalyst phase) may be added back to the solvent phase or a new solvent, in order to form again an emulsion of the disperse catalyst phase in the continuous solvent phase. The catalyst phase, comprising the inclusion providing agent, usually is present in this mixture in the form of small droplets, corresponding in shape and size approximately to the catalyst particles to be prepared. Said catalyst particles, comprising the inclusions may then be formed and recovered in usual manner, including the solidification of the catalyst particles by heating and separating steps (for recovering the catalyst particles). In this connection reference is made to the disclosure in the international applications WO 03/000754, WO 03/000757, WO 2007/077027, WO 2004/029112 and WO 2007/077027 disclosing suitable reaction conditions. This disclosure is incorporated herein by reference. The catalyst particles obtained may furthermore be subjected to further post-processing steps, such as washing, stabilizing, prepolymerization, prior to the final use in polymerisation processes.

An alternative to the above outlined method of preparing the catalyst particles of the present invention, in particular suitable for a method employing solid inclusion providing agents, is a method wherein the inclusion providing agent is already introduced at the beginning of the process, i.e. during the step of forming the catalyst solution/catalyst phase. Such a sequence of steps facilitates the preparation of the catalyst particles since the catalyst phase, after formation, has not to be separated from the solvent phase for admixture with the inclusion providing agent.

Suitable method conditions for the preparation of the catalyst phase, the admixture with the solvent phase, suitable additives therefore etc. are disclosed in the above mentioned international applications WO 03/000754, WO 03/000757, WO 2007/077027, WO 2004/029112 and WO 2007/077027, which are incorporated herein by reference.

As is derivable from the above and the following examples, the present invention allows the preparation of novel catalyst particles comprising inclusions being solid material as defined in the claims. The size, shape, amount and distribution thereof within the catalyst particles may be controlled by the agents for providing inclusions employed and the process conditions, in particular in the above outlined mixing conditions.

Moreover the present invention is also directed to the use of the above defined solid catalyst particles for the preparation of a heterophasic propylene copolymer, in particular for the preparation of a heterophasic propylene copolymer as defined in the instant invention.

The above defined catalyst system comprising the solid catalyst particles is—as stated above—used in a process for the manufacture heterophasic propylene copolymer.

The process comprises at least two stages, in the first stage the propylene polymer matrix in the presence of the catalyst system as defined in the instant invention is produced. In the second stage the elastomeric propylene copolymer is polymerized in the presence of the propylene polymer matrix. Preferably also in the second stage the catalyst system as defined in the instant invention is present.

It is in particular preferred that the inventive process comprise only the two stages as defined in the instant invention, i.e. the process does not comprises further stages in which other polymers are produced.

The first stage may comprise at least one slurry reactor, preferably a loop reactor, and optionally at least one gas phase reactor, typically one or two gas phase reactor(s). The slurry reactor may be a bulk reactor, where the reaction medium is propylene. The second stage comprises at least one gas phase reactor, typically 1 or 2 gas phase reactor(s), which is (are) also sometimes called a rubber phase reactor.

It is also possible that the first stage comprises only a bulk reactor, where the propylene polymer matrix is formed, and the first gas phase reactor acts as a rubber phase reactor (the second stage). However, it is more usual, that the first stage comprises one loop reactor, i.e. one bulk reactor, and one gas phase reactor.

Preferably the polymerization conditions for the slurry reactor of the first stage may be as follows:
the temperature is within the range of 40 to 110° C., preferably between 60 and 90° C.,
the pressure is within the range of 20 to 80 bar, preferably between 30 to 60 bar,
hydrogen can be added for controlling the molar mass in a manner known per se.

The reaction mixture from the slurry (bulk) reactor is optionally transferred to the gas phase reactor of the first stage polymerization. The polymerization conditions in the gas phase reactor may be as follows:
the temperature is within the range of 50 and 130° C., preferably between 65 and 100° C., and still more preferably between 70 and 85° C.
the pressure is within the range of 5 to 50 bar, preferably between 15 to 35 bar,
hydrogen can be added for controlling the molar mass in a manner known per se.

The polymerization conditions in the rubber gas phase reactor (the second stage) can be the same as in the gas phase reactor of the first stage.

The monomers used in the polymerization stages depend on the desired heterophasic propylene copolymer. Also the amounts of comonomers fed into the several reactors used are adjusted to achieve the desired heterophasic propylene copolymer.

For instance the propylene polymer matrix can be a propylene homopolymer or a propylene (random) copolymer. In the first case only propylene is fed to the reactor(s) of the first stage. However in case a propylene (random) copolymer as a matrix is desired in addition to propylene also further monomers are fed, for instance ethylene and/or higher α-olefin(s), i.e. C4 to C12 α-olefin(s), more preferably C4-C8 α-olefin(s). Preferably in case the matrix shall be propylene (random) copolymer ethylene and/or 1-butene is used as a comonomer.

The matrix being a propylene (random) copolymer can be produced in the first stage comprising at least two reactors, i.e. a slurry reactor and a gas phase reactor. Such a two reactor system enables to produce a matrix of mutimodal character with respect to the ethylene content as well as—if desired—to the molecular weight distribution. Such a procedure is well known in the art. Accordingly, for a matrix being a propylene (random) copolymer it is preferred that the comonomer content, in particular ethylene content, of the propylene random copolymer produced in the slurry reactor is less than 6.0 wt.-%, more preferably less than 5.0 wt.

Accordingly in the slurry reactor not necessarily a comonomer is fed in. In such a case in the slurry reactor a propylene homopolymer is obtained. However in such circumstances at least in the gas phase reactor of the first stage a comonomer must be present to obtain a (random) propylene copolymer as a matrix according to this invention.

Thus it is appreciated that the comonomer, like ethylene, content in material produced in the gas phase reactor, regardless of what is produced in the slurry reactor, is below 12 wt-%, preferably below 10 wt-%. It can be noted that it is also possible to produce in the first stage a homopolymer matrix or a homopolymer in the slurry step and a (random) propylene copolymer in the gas phase, or vice verca. Preferably the matrix produced in the first stage is a (random) propylene copolymer.

The feed of comonomers into the first stage comprising a loop and gas phase reactor is adjusted to obtain a final propylene random copolymer as a matrix with a comonomer, like ethylene, content preferably less than 8.0 wt.-%, more preferably in the range of 5.0 to 8.0 wt.-%.

In the second stage the rubber part (elastomeric propylene copolymer) of the heterophasic propylene copolymer is formed in the presence of the propylene polymer matrix from the first stage by polymerizing propylene with ethylene and/or another higher α-olefin, i.e. $C_2$ to $C_{10}$ α-olefin. Preferably the α-olefin—except propylene which must be present—is selected form the group consisting of ethylene, 1-butene, 1-pentene, 1-hexene, 1-hepetene and 1-octene. Preferably the elastomeric propylene copolymer comprises at least propylene and ethylene and may comprise a further α-olefin as defined in this paragraph. However it is in particular preferred that the elastomeric propylene copolymer comprises, more preferably consists of, propylene and ethylene as the only polymerizable units. Thus ethylene and propylene are used as the only monomers to obtain an ethylene-propylene rubber (EPR) as elastomeric propylene copolymer.

Depending on the amounts of each monomers used in the two stages the heterophasic propylene copolymer can be tailored for different purposes. For instance the inventive process is in particular suitable to produce a heterophasic propylene copolymer with rather high amounts of elastomeric propylene copolymer within the matrix. Of course the present process is also suitable to produce heterophasic propylene copolymer with "conventional" amounts of elastomeric propylene copolymer. In all cases a material is obtained which is less sticky compared to heterophasic polymer counterparts produced with catalyst systems being state of the art for these processes.

Accordingly the inventive process leads to a heterophasic polypropylene copolymer comprising at least 40 wt.-%, more preferably at least 55 wt.-%, yet more preferably 60 wt.-% propylene polymer matrix. The upper limit may be up to 80 wt.-%, like up to 75 wt.-%. In some embodiments preferable ranges for the matrix component are 40 to 80 wt%, e. g. 45 to 80 wt.-%, such as 45 to 75 wt.-%. Furthermore, in some further alternative embodiments 50 to 80 wt.-%, or even 50 to 70 wt.-% of matrix may be desired. However as stated above the inventive process is in particular suitable to produce a heterophasic propylene copolymer with rather high amounts of rubber part, which means in such case that the amount of matrix is comparatively low. Accordingly in an alternative embodiment the amount of the propylene polymer matrix in the heterophasic propylene copolymer is below 65 wt.-%, preferably below 55 wt.-%, still more preferably below 50 wt.-%.

The amount of the rubber part (elastomeric propylene copolymer) within the heterophasic propylene copolymer may be up to 60 wt.-%, more preferably up to 55 wt%, still more preferably up to 45 wt.-%. The lower limit may be at least 20 wt.-%, more preferably at least 25 wt.-%. Preferable ranges of the rubber part (elasotomeric propylene copolymer) in some embodiments are 20 to 60 wt.-%, e. g. 20 to 55 wt.-%, such as 25 to 55 wt.-%. Furthermore, in some further alternative embodiments 20 to 50 wt.-%, or even 30 to 50 wt.-% of rubber may be desired.

The comonomer content in the elastomeric propylene copolymer is desirably relatively high, i.e. up to 70.0 wt.-%, more preferably up to 60.0 wt.-%, yet more preferably up to 55 wt.-%. Accordingly a preferred range for the comonomer content, like ethylene, is 12.0 to 70.0 wt.-%, more preferably 20.0 to 60.0 wt.-%, yet more preferably 25.0 to 55.0 wt.-%. Preferably the elastomeric propylene copolymer is an ethylene-propylene rubber (EPR), in particular with a ethylene content as defined in this paragraph.

Preferably the heterophasic propylene copolymer comprises only the matrix and the rubber phase as defined in the instant invention, i.e. does not comprises further polymer components.

As stated several times in the instant invention, the heterophasic propylene copolymer of this invention is featured by a surprising low stickiness. This holds true for all heterophasic propylene copolymer types, i.e. with a rather low amount of elastomeric phase but is in particular noticeable for products having a rather high amount of elastomeric phase (see FIG. 1). The reduced stickiness is achieved due to the fact that the elastomeric propylene copolymer is essentially embedded in pores or cavities within the matrix having no contact to the surface. This specific structure of heterophasic propylene copolymer particles is caused by the so called replication effect. Due to this replication effect the morphology of the propylene matrix particles also correlates to the particle morphology of the catalyst particles, which enables the elastomeric material to be embedded inside the matrix polymer particles. The areas of the catalyst particles constituting the matrix phase comprising the catalytically active sites find their correlation in the product particles in areas of the polymer, while the inclusions of the catalyst particles give rise to hollow voids within the product particles. The catalyst particle morphology accordingly determines the product morphology, so that desired product morphologies may already be adjusted/controlled during the preparation of the catalyst particles.

The melt flow rate (MFR) is measured in g/10 min of the polymer discharged through a defined die under specified temperature and pressure conditions and the measure of viscosity of the polymer which, in turn, for each type of polymer is mainly influenced by its molecular weight but also by its degree of branching. The melt flow rate measured under a load of 2.16 kg at 230° C. (ISO 1133) is denoted as $MFR_2$ (230° C.). Accordingly, it is preferred that in the present invention the heterophasic propylene copolymer has a $MFR_2$ (230° C.) in the range of 0.03 to 2000 g/10 min, preferably 0.03 to 1000 g/10 min, most preferably 0.2 to 400 g/10 min.

The present invention is further described by way of examples.

EXAMPLES

1. Definitions/Measuring Methods

The following definitions of terms and determination methods apply for the above general description of the invention as well as to the below examples unless otherwise defined.

Number average molecular weight ($M_n$), weight average molecular weight ($M_w$) and molecular weight distribution (MWD) are determined by size exclusion chromatography (SEC) using Waters Alliance GPCV 2000 instrument with online viscometer. The oven temperature is 140° C. Trichlorobenzene is used as a solvent (ISO 16014).

$MFR_2$ (230° C.) is measured according to ISO 1133 (230° C., 2.16 kg load).

Ethylene content, in particular of the matrix, is measured with Fourier transform infrared spectroscopy (FTIR) calibrated with $^{13}$C-NMR. When measuring the ethylene content in polypropylene, a thin film of the sample (thickness about 250 mm) was prepared by hot-pressing. The area of absorption peaks 720 and 733 $cm^{-1}$ was measured with Perkin Elmer FTIR 1600 spectrometer. The method was calibrated by ethylene content data measured by $^{13}$C-NMR.

Content of any one of the C4 to C20 α-olefins is determined with $^{13}$C-NMR; literature: "IR-Spektroskopie für Anwender"; WILEY-VCH, 1997 and "Validierung in der Analytik", WILEY-VCH, 1997.

Melting Temperature Tm, Crystallization Temperature Tc, and the Degree of Crystallinity:

measured with Mettler TA820 differential scanning calorimetry (DSC) on 5-10 mg samples. Both crystallization and melting curves were obtained during 10° C./min cooling and heating scans between 30° C. and 225° C. Melting and crystallization temperatures were taken as the peaks of endotherms and exotherms.

Xylene Soluble Fraction (XS) and Amorphous Fraction (AM)

2.0 g of polymer are dissolved in 250 ml p-xylene at 135° C. under agitation. After 30±2 minutes the solution is allowed to cool for 15 minutes at ambient temperature and then allowed to settle for 30 minutes at 25±0.5° C. The solution is filtered with filter paper into two 100 ml flasks.

The solution from the first 100 ml vessel is evaporated in nitrogen flow and the residue is dried under vacuum at 90° C. until constant weight is reached.

$$XS\% = (100 \times m_1 \times v_0)/(m_0 \times v_1)$$

$m_0$=initial polymer amount (g)
$m_1$=weight of residue (g)
$v_0$=initial volume (ml)
$v_1$=volume of analysed sample (ml)

The solution from the second 100 ml flask is treated with 200 ml of acetone under vigorous stirring. The precipitate is filtered and dried in a vacuum-oven at 90° C.

$$AM\% = (100 \times m_2 \times v_0)/(m_0 \times v_1)$$

$m_0$=initial polymer amount (g)
$m_2$=weight of precipitate (g)
$v_0$=initial volume (ml)
$v_1$=volume of analysed sample (ml)

Flowability 90 g of polymer powder and 10 ml of xylene was mixed in a closed glass bottle and shaken by hand for 30 minutes. After that the bottle was left to stand for an additional 1.5 hour while occasionally shaken by hand. Flowability was measured by letting this sample flow through a funnel at room temperature. The time it takes for the sample to flow through is a measurement of stickiness. The average of 5 separate determinations was defined as flowability. The dimensions of the funnel can be deducted from FIG. 2.

Porosity: BET with $N_2$ gas, ASTM 4641, apparatus Micromeritics Tristar 3000; sample preparation (catalyst and polymer): at a temperature of 50° C., 6 hours in vacuum.

Surface area: BET with $N_2$ gas ASTM D 3663, apparatus Micromeritics Tristar 3000:

sample preparation (catalyst and polymer): at a temperature of 50° C., 6 hours in vacuum.

Mean particle size is measured with Coulter Counter LS200 at room temperature with n-heptane as medium; particle sizes below 100 nm by transmission electron microscopy Bulk density BD is measured according ASTM D 1895

Determination of Ti and Mg Amounts in the Catalyst

The determination of Ti and Mg amounts in the catalysts components is performed using ICP. 1000 mg/l standard solutions of Ti and Mg are used for diluted standards (diluted standards are prepared from Ti and Mg standard solutions, distilled water and $HNO_3$ to contain the same $HNO_3$ concentration as catalyst sample solutions).

50-100 mg of the catalyst component is weighed in a 20 ml vial (accuracy of weighing 0.1 mg). 5 ml of concentrated $HNO_3$ (Suprapur quality) and a few milliliters of distilled water is added. The resulting solution is diluted with distilled water to the mark in a 100 ml measuring flask, rinsing the vial carefully. A liquid sample from the measuring flask is filtered using 0.45 µm filter to the sample feeder of the ICP equipment. The concentrations of Ti and Mg in the sample solutions are obtained from ICP as mg/l.

Percentages of the elements in the catalyst components are calculated using the following equation:

$$\text{Percentage (\%)} = (A \cdot V \cdot 100\% \cdot V \cdot 1000^{-1} \cdot m^{-1}) \cdot (V_a \cdot V_b^{-1})$$

where
A=concentration of the element (mg/l)
V=original sample volume (100 ml)
m=weight of the catalyst sample (mg)
$V_a$=volume of the diluted standard solution (ml)
$V_b$=volume of the 1000 mg/l standard solution used in diluted standard solution (ml)

Determination of Donor Amounts in the Catalyst Components

The determination of donor amounts in the catalyst components is performed using HPLC (UV-detector, RP-8 column, 250 mm×4 mm). Pure donor compounds are used to prepare standard solutions.

50-100 mg of the catalyst component is weighed in a 20 ml vial (accuracy of weighing 0.1 mg). 10 ml acetonitrile is added and the sample suspension is sonicated for 5-10 min in an ultrasound bath. The acetonitrile suspension is diluted appropriately and a liquid sample is filtered using 0.45 μm filter to the sample vial of HPLC instrument. Peak heights are obtained from HPLC.

The percentage of donor in the catalyst component is calculated using the following equation:

Percentage (%)=$A_1 \cdot c \cdot V \cdot A_2^{-1} \cdot m^{-1} \cdot 0.1\%$ where
$A_1$=height of the sample peak
c=concentration of the standard solution (mg/l)
V=volume of the sample solution (ml)
$A_2$=height of the standard peak
m=weight of the sample (mg)

2. Preparation of the Examples

Example 1

Preparation of a Soluble Mg-Complex

A magnesium complex solution was prepared by adding, with stirring, 55.8 kg of a 20% solution in toluene of BOMAG $(Mg(Bu)_{1.5}(Oct)_{0.5})$ to 19.4 kg 2-ethylhexanol in a 150 l steel reactor. During the addition the reactor contents were maintained below 20° C. The temperature of the reaction mixture was then raised to 60° C. and held at that level for 30 minutes with stirring, at which time reaction was complete. 5.50 kg 1,2-phthaloyl dichloride was then added and stirring of the reaction mixture at 60° C. was continued for another 30 minutes. After cooling to room temperature a yellow solution was obtained.

Example 2

Catalyst with Internal Pore Structure 24 kg titanium tetrachloride was placed in a 90 l steel reactor. A mixture of 0.190 kg $SiO_2$ nanoparticles (mean particle size 80 nm; surface area 440 $m^2$/g; bulk density 0.063 g/$cm^3$) provided by Nanostructured & Amorpohous Inc. (NanoAmor) and 21.0 kg of Mg-complex were then added to the stirred reaction mixture over a period of two hours. During the addition of the Mg-complex the reactor contents were maintained below 35° C.

4.5 kg n-heptane and 1.05 l Viscoplex 1-254 of RohMax Additives GmbH (a polyalkyl methacrylate with a viscosity at 100° C. of 90 $mm^2$/s and a density at 15° C. of 0.90 g/ml) were then added to the reaction mixture at room temperature and stirring was maintained at that temperature for a further 60 minutes.

The temperature of the reaction mixture was then slowly raised to 90° C. over a period of 60 minutes and held at that level for 30 minutes with stirring. After settling and siphoning the solids underwent washing with a mixture of 0.244 l of a 30% solution in toluene of diethyl aluminum dichlorid and 50 kg toluene for 110 minutes at 90° C., 30 kg toluene for 110 minutes at 90° C., 30 kg n-heptane for 60 minutes at 50° C., and 30 kg n-heptane for 60 minutes at 25° C.

Finally, 4.0 kg white oil (Primol 352; viscosity at 100° C. of 8.5 $mm^2$/s; density at 15° C. of 50.87 g/ml) was added to the reactor. The obtained oil slurry was stirred for a further 10 minutes at room temperature before the product was transferred to a storage container.

From the oil slurry a solids content of 23.4 wt.-% was analyzed.

Example 3A

Compact Catalyst Particles—No Internal Pores

Same as in example 2, but no $SiO_2$ nano-particles were added to the Mg-complex.

Example 3B

Preparation of Catalyst with Solid Material (Comparative Example)

19.5 ml titanium tetrachloride was placed in a 300 ml glass reactor equipped with a mechanical stirrer. 150 mg of EXM 697-2 (magnesium-aluminum-hydroxy-carbonate from Süd-Chemie AG having a mean particle size well above 300 nm) were added thereto. Then 10.0 ml of n-heptane was added. Mixing speed was adjusted to 170 rpm, and 32.0 g Mg-complex was slowly added over a period of 2 minutes. During the addition of the Mg-complex the reactor temperature was kept below 30° C.

A solution of 3.0 mg polydecene in 1.0 ml toluene and 2.0 ml Viscoplex 1-254 were then added to the reaction mixture at room temperature. After 10 minutes stirring, the temperature of the reaction mixture was slowly raised to 90° C. over a period of 20 minutes and held at that level for 30 minutes with stirring.

After settling and syphoning the solids underwent washing with 100 ml toluene at 90° C. for 30 minutes, twice with 60 ml heptane for 10 minutes at 90° C. and twice with 60 ml pentane for 2 minutes at 25° C. Finally, the solids were dried at 60° C. by nitrogen purge. From the catalyst 13.8 wt-% of magnesium, 3.0 wt-% titanium and 20.2 wt.-% di(2-ethylhexy)phthalate (DOP) was analyzed.

The test homopolymerization was carried out as for catalyst examples 2 to 5.

Example 4

Catalyst with Internal Pore Structure 19.5 ml titanium tetrachloride was placed in a 300 ml glass reactor equipped with a mechanical stirrer. Mixing speed was adjusted to 170 rpm. 32.0 g of the Mg-complex were then added to the stirred reaction mixture over a 10 minute period. During the addition of the Mg-complex the reactor contents were maintained below 30° C.

1.0 ml of a solution in toluene of 3.0 mg polydecene and 2.0 ml Viscoplex 1-254 of RohMax Additives GmbH (a polyalkyl methacrylate with a viscosity at 100° C. of 90 $mm^2$/s and a density at 15° C. of 0.90 g/ml) were then added, and after 5 minutes stirring at room temperature a suspension of 0.4 g $SiO_2$ nanoparticles (mean particle size 80 nm; surface area 440 $m^2$/g; bulk density 0.063 g/$cm^3$) provided by Nanostructured & Amorpohous Inc. (NanoAmor) in 10.0 ml of n-heptane was added. Stirring was maintained at room temperature for 30 minutes.

The temperature of the reaction mixture was then slowly raised to 90° C. over a period of 20 minutes and held at that level for 30 minutes with stirring.

After settling and syphoning the solids underwent washing with a mixture of 0.11 ml diethyl aluminum chloride and 100 ml toluene at 90° C. for 30 minutes, 60 ml heptane for 20 minutes at 90° C. and 60 ml pentane for 10 minutes at 25° C. Finally, the solids were dried at 60° C. by nitrogen purge, to yield a yellow, air-sensitive powder.

Example 5

Catalyst with Internal Pore Structure 19.5 ml titanium tetrachloride was placed in a 300 ml glass reactor equipped with a mechanical stirrer. Mixing speed was adjusted to 170 rpm. 32.0 g of the Mg-complex were then added to the stirred reaction mixture over a 10 minute period. During the addition of the Mg-complex the reactor contents were maintained below 30° C.

1.0 ml of a solution in toluene of 3.0 mg polydecene and 2.0 ml Viscoplex 1-254 of RohMax Additives GmbH (a polyalkyl methacrylate with a viscosity at 100° C. of 90 mm$^2$/s and a density at 15° C. of 0.90 g/ml) were then added, and after 5 minutes stirring at room temperature a suspension of 0.6 g $Al_2O_3$ nanoparticles (mean particle size 60 nm; surface area 25 m$^2$/g; bulk density 0.52 g/cm$^3$) provided by Nanostructured & Amorpohous Inc. (NanoAmor) in 10.0 ml of n-heptane was added. Stirring was maintained at room temperature for 30 minutes.

The temperature of the reaction mixture was then slowly raised to 90° C. over a period of 20 minutes and held at that level for 30 minutes with stirring.

After settling and syphoning the solids underwent washing with a mixture of 0.11 ml diethyl aluminum chloride and 100 ml toluene at 90° C. for 30 minutes, 60 ml heptane for 20 minutes at 90° C. and 60 ml pentane for 10 minutes at 25° C. Finally, the solids were dried at 60° C. by nitrogen purge, to yield a yellow, air-sensitive powder.

Example 6

All raw materials were essentially free from water and air and all material additions to the reactor and the different steps were done under inert conditions in nitrogen atmosphere. The water content in propylene was less than 5 ppm.

The polymerisation was done in a 5 liter reactor, which was heated, vacuumed and purged with nitrogen before taken into use. 276 µl TEA (tri ethyl Aluminium, from Witco used as received), 47 µl donor Do (dicyclo pentyl dimethoxy silane, from Wacker, dried with molecular sieves) and 30 ml pentane (dried with molecular sieves and purged with nitrogen) were mixed and allowed to react for 5 minutes. Half of the mixture was added to the reactor and the other half was mixed with 14.9 mg highly active and stereo specific Ziegler Natta catalyst of example 2. After about 10 minutes was the ZN catalyst/TEA/donor D/pentane mixture added to the reactor. The Al/Ti molar ratio was 250 and the Al/Do molar ratio was 10. 200 mmol hydrogen and 1400 g of propylene were added to the reactor. The temperature was increased from room temperature to 80° C. during 16 minutes. The reaction was stopped, after 30 minutes at 80° C., by flashing out unreacted monomer. Finally the polymer powder was taken out from the reactor and analysed and tested. The MFR of the product was 6 g/10 min. The other polymer details are seen in table 3. The result from the flowability test was 1.9 seconds.

Example 7

This example was done in accordance with example 6, but after having flashed out unreacted propylene after the bulk polymerisation step the polymerisation was continued in gas phase (rubber stage). After the bulk phase the reactor was pressurised up to 5 bar and purged three times with a 0.75 mol/mol ethylene/propylene mixture. 200 mmol hydrogen was added and temperature was increased to 80° C. and pressure with the aforementioned ethylene/propylene mixture up to 20 bar during 14 minutes. Consumption of ethylene and propylene was followed from scales. The reaction was allowed to continue until in total 403 g of ethylene and propylene had been fed to the reactor. MFR of the final product was 2.8 g/10 min and XS was 43.5 wt.-%. The polymer powder showed almost no stickiness, which is also seen in the good flowability. The result from the flowability test was 5.1 seconds. Other details are seen in table 3.

Example 8

This example was done in accordance with example 6, with the exception that the catalyst of example 4 is used. The product had MFR 8.4 g/10 min and XS 1.5 wt.-%. The other details are seen in table 3. The result from the flowability test was 2.0 seconds.

Example 9

This example was done in accordance with example 8, with the exception that after the bulk polymerisation stage the reaction was continued in gas phase as was described in example 7, with the exception that the hydrogen amount was 180 mmol. The reaction was stopped when in total 411 g of ethylene and propylene had been fed to the reactor.

MFR of the product was 3.9 g/10 min and XS 44.3 wt.-%. The powder had good flowability. The result from the flowability test was 6.7 seconds. The other details are seen in table 3.

Example 10

This example was done in accordance with example 8, with the exception that after the bulk polymerisation stage the reaction was continued in gas phase as was described in example 7, with the exception that the hydrogen amount was 180 mmol.

The reaction was stopped when in total 437 g of ethylene and propylene had been fed to the reactor.

MFR of the product was 3.6 g/10 min and XS 47.8 wt.-%. The powder was slightly sticky. The result from the flowability test was 11.6 seconds. The other details are seen in table 3.

Example 11

This example was done in accordance with example 6, with the exception that the catalyst of example 5 is used.

MFR of the product was 9.3 g/10 min and XS was 1.6 wt.-%. The result from the flowability test was 3.0 seconds. The other details are seen in table 3.

Example 12

This example was done in accordance with example 11, with the exception that after the bulk polymerisation stage the reaction was continued in gas phase as was described in example 7, but with a hydrogen amount of 250 mmol. The reaction was stopped when in total 445 g of ethylene and propylene had been fed to the reactor.

MFR of the product was 3.3 g/10 min and XS was 48.8 wt.-%. The polymer powder was free flowing and the result from the flowability test was 6.0 seconds. The other details are seen in table 3.

Example 13

Comparative Example

This example was done in accordance with example 6, with the exception that the catalyst described in example 3A was used. This catalyst contains no nano particles.

MFR of the product was 8.9 g/10 min and XS 1.2 w-%. The other details are shown in table 3.

Example 14

Comparative Example

This example was done in accordance with example 13, with the exception that after the bulk polymerisation stage the reaction was continued in gas phase as was described in example 7, but with a hydrogen amount of 90 mmol. The reaction was stopped when in total 243 g of ethylene and propylene had been fed to the reactor.

MFR of the product was 5.1 g/10 min and XS was 25.6 wt.-%. The polymer powder was quite sticky already at this low rubber level and the result from the flowability test was 11.4 seconds. The other details are seen in table 3.

Example 15

Comparative Example

This example was done in accordance with example 13, with the exception that after the bulk polymerisation stage the reaction was continued in gas phase as was described in example 7, but with a hydrogen amount of 250 mmol. The reaction was stopped when in total 312 g of ethylene and propylene had been fed to the reactor.

MFR of the product was 4.3 g/10 min and XS was 34.9 wt.-%. The polymer powder was so sticky that it was not possible to measure the flowability. The other details are seen in table 3.

TABLE 1

Properties of the catalyst particles

|  |  | Ex 2 | Ex 3A | Ex 4 | Ex 5 |
|---|---|---|---|---|---|
| Ti | [wt.-%] | 2.56 | 3.81 | 3.90 | 2.29 |
| Mg | [wt.-%] | 11.6 | 11.4 | 12.5 | 7.06 |
| DOP | [wt.-%] | 22.7 | 24.4 | 26.7 | 28.1 |
| Nanoparticles | [wt.-%] | 7.4 | — | 8.9 | 5.1 |
| $d_{50}$ | [µm] | 25.6 | 21.9 | 34.5 | 29.7 |
| Mean | [µm] | 25.60 | 20.2 | 35.4 | 32.9 |
| Surface area* | [m$^2$/g] | 13.0 | <5 | <5 | <5 |
| Porosity | [ml/g] | 0.09 | — | 0.0 | 0.0 |

*the lowest limit for measure surface area by the used method is 5 m$^2$/g

Test Homopolymerisation with Catalysts of Examples 2 to 5

The propylene bulk polymerisation was carried out in a stirred 5 l tank reactor. About 0.9 ml triethyl aluminium (TEA) as a co-catalyst, ca. 0.12 ml cyclohexyl methyl dimethoxy silane (CMMS) as an external donor and 30 ml n-pentane were mixed and allowed to react for 5 minutes. Half of the mixture was then added to the polymerisation reactor and the other half was mixed with about 20 mg of a catalyst. After additional 5 minutes the catalyst/TEA/donor/n-pentane mixture was added to the reactor. The Al/Ti mole ratio was 250 mol/mol and the Al/CMMS mole ratio was 10 mol/mol. 70 mmol hydrogen and 1400 g propylene were introduced into the reactor and the temperature was raised within ca 15 minutes to the polymerisation temperature 80° C. The polymerisation time after reaching polymerisation temperature was 60 minutes, after which the polymer formed was taken out from the reactor.

TABLE 2

Homopolymerization results

|  |  | Ex 2 | Ex 3A | EX 3B | Ex 4 | Ex 5 |
|---|---|---|---|---|---|---|
| Activity | [kg PP/g cat * 1 h] | 34.2 | 31.9 | 27.6 | 30.5 | 33.7 |
| XS | [wt.-%] | 1.3 | 1.6 | 2.1 | 1.4 | 1.5 |
| MFR | [g/10 min] | 7.4 | 8.0 | 5.9 | 6.8 | 5.4 |
| Bulk density | [kg/m$^3$] | 517 | 528 | 400 | 510 | 390 |
| Surface area* | [m$^2$/g] | <5 | <5 |  | <5 | <5 |
| Porosity | [ml/g] | 0.0 | — |  | 0.0 | 0.0 |

*the lowest limit for measure surface area by the used method is 5 m$^2$/g

From the test homopolymerization results it can be seen that polymer produced with comparative catalyst 3B, i.e. catalyst with solid material being magnesium-aluminum-hydroxy-carbonate has clearly lower activity as well clearly higher XS. The solid material used in comparative example 3B has particles from several hundreds nm to several micrometers.

TABLE 3 (A)

Polymerization results of examples 6 to 9

|  |  | Ex 6 | Ex 7 | Ex 8 | Ex 9 |
|---|---|---|---|---|---|
| Cat of example |  | Ex 2 | Ex 2 | E 4 | Ex 4 |
| Cat amount | [mg] | 14.9 | 11.7 | 11.7 | 12.8 |
| Bulk polymerization |  |  |  |  |  |
| Temperature | [° C.] | 80 | 80 | 80 | 80 |
| Time | [min] | 30 | 30 | 30 | 30 |
| Gas phase polymerization |  |  |  |  |  |
| Hydrogen | [mmol] | — | 200 | — | 180 |
| Time | [min] | — | 45 | — | 53 |
| Ethylene/propylene in feed | [mol/mol] | — | 0.75 | — | 0.75 |
| Ethylene fed total | [g] | — | 135 | — | 134 |
| Propylene fed total | [g] | — | 268 | — | 277 |
| Yield | [g] | 404 | 608 | 274 | 590 |
| Polymer product |  |  |  |  |  |
| Ethylene in polymer | [wt.-%] | — | 16.7 | — | 17.3 |
| XS | [wt.-%] | 0.8 | 43.5 | 1.5 | 44.3 |
| AM | [wt.-%] | — | 42.8 | — | 43.5 |
| Ethylene in AM | [wt.-%] | — | 32.8 | — | 35.7 |
| Mw of AM/1000 | [g/mol] | — | 230 | — | 217 |
| MFR | [g/10 min] | 6 | 2.8 | 8.4 | 3.9 |
| Melting point | [° C.] | 164.9 | 163.8 | 163.8 | 164.6 |
| Crystallinity | [%] | 55 | 27 | 53 | 27 |
| Flow average | [s] | 1.9 | 5.1 | 2.0 | 6.7 |

TABLE 3 (B)

Polymerization results of examples 10 to 12

|  |  | Ex 10 | Ex 11 | Ex 12 |
|---|---|---|---|---|
| Cat of example |  | Ex 4 | Ex 5 | Ex 5 |
| Cat amount | [mg] | 12.7 | 11.7 | 12.5 |
| Bulk polymerization |  |  |  |  |
| Temperature | [° C.] | 80 | 80 | 80 |
| Time | [min] | 30 | 30 | 30 |

TABLE 3 (B)-continued

Polymerization results of examples 10 to 12

|  |  | Ex 10 | Ex 11 | Ex 12 |
|---|---|---|---|---|
| Gas phase polymerization |  |  |  |  |
| Hydrogen | [mmol] | 180 | — | 250 |
| Time | [min] | 61 | — | 50 |
| Ethylene/propylene in feed | [mol/mol] | 0.75 | — | 0.75 |
| Ethylene fed total | [g] | 144 | — | 148 |
| Propylene fed total | [g] | 293 | — | 297 |
| Yield | [g] | 606 | 285 | 625 |
| Polymer product |  |  |  |  |
| Ethylene in polymer | [wt.-%] | 19.1 | — | 19.8 |
| XS | [wt.-%] | 47.8 | 1.6 | 48.8 |
| AM | [wt.-%] | 46.2 | — | 48.3 |
| Ethylene in AM | [wt.-%] | 34.7 | — | 30 |
| Mw of AM/1000 | [g/mol] | 226 | — | 250 |
| MFR | [g/10 min] | 3.6 | 9.3 | 3.3 |
| Melting point | [° C.] | 162.6 | 163.8 | 162.8 |
| Crystallinity | [%] | 25 | 54 | 24 |
| Flow average | [s] | 11.6 | 3.0 | 6.0 |

TABLE 3 (C)

Polymerization results of examples 10 to 12

|  |  | Ex 13 Comp | Ex 14 Comp | Ex 15 Comp |
|---|---|---|---|---|
| Catalyst of example |  | Ex 3A | Ex 3A | Ex 3A |
| Cat amount | [mg] | 16.5 | 16.5 | 16.5 |
| Bulk polymerization |  |  |  |  |
| Temperature | [° C.] | 80 | 80 | 80 |
| Time | [min] | 30 | 30 | 30 |
| Gas phase polymerization |  |  |  |  |
| Hydrogen | [mmol] | — | 90 | 90 |
| Time | [min] | — | 21 | 32 |
| Ethylene/propylene in feed | [mol/mol] | — | 0.75 | 0.75 |
| Ethylene fed total | [g] | — | 79 | 106 |
| Propylene fed total | [g] | — | 164 | 206 |
| Yield | [g] | 299 | 436 | 519 |
| Polymer product |  |  |  |  |
| Ethylene in polymer | [wt.-%] | — | 10.7 | 13.9 |
| XS | [wt.-%] | 1.2 | 25.6 | 34.9 |
| AM | [wt.-%] | — | 25 | 34 |
| Ethylene in AM | [wt.-%] | — | 36 | 37.1 |
| Mw of AM/1000 | [g/mol] | — | 270 | 271 |
| MFR | [g/10 min] | 8.9 | 5.1 | 4.3 |
| Melting point | [° C.] | 164.9 | 163.2 | 163.9 |
| Crystallinity | [%] | 48 | 37 | 34 |
| Flow average | [s] | 1.6 | 11.4 | too sticky |

We claim:

1. Process for the manufacture of heterophasic propylene copolymer compositions comprising the steps of
   (a) in a first stage, forming a propylene polymer matrix in at least one slurry reactor and optionally in at least one gas phase reactor,
   (b) in a second stage, forming in at least one gas phase reactor an elastomeric propylene copolymer by copolymerizing propylene with ethylene and/or with another a-olefin in the presence of said matrix, wherein the polymerization at least in the first stage is carried out in the presence of a catalyst system comprising a catalyst in form of solid particles, said particles (i) have a surface area of less than 20 m$^2$/g
   (ii) comprise a transition metal compound which is selected from one of the groups 4 to 10 of the periodic table (IUPAC) or a compound of actinide or lanthanide,
   (iii) comprise a metal compound which is selected from one of the groups 1 to 3 of the periodic table (IUPAC), and
   (iv) comprise inclusions not comprising catalytically active sites.

2. Process according to claim 1, wherein the particles are spherical.

3. Process according to claim 1, wherein the inclusions are free
   (a) of transition metal compounds which are selected from one of the groups 4 to 10 of the periodic table (IUPAC) and
   (b) of compounds of actinide or lanthanide.

4. Process according to claim 1, wherein particles have a porosity of less than 1.0 ml/g.

5. Process according to claim 1, wherein the particles have a mean particle size of from 5 to 200 μm.

6. Process according to claim 1, wherein the inclusions are evenly distributed within the particles.

7. Process according to claim 1, wherein the inclusions are selected from the group consisting of
   (a) hollow voids, optionally partially filled with a liquid and/or a solid material,
   (b) liquids,
   (c) solid material, and
   (d) mixtures of (a) to (c).

8. Process according to claim 7, wherein the solid material is selected from inorganic materials and organic polymeric materials.

9. Process according to claim 7, wherein the inclusions, in particular the solid material, have (has) a particle size of below 200 nm.

10. Process according to claim 7, wherein the solid material has a surface area of below 500 m$^2$/g.

11. Process according to any one of the claims 1, wherein the solid particles comprise from 8 to 30 vol.-% of inclusions, based on the total volume of the particles.

12. Process according to claim 1, wherein solid particles comprise not more than 30.0 wt.-%, inclusions being solid material.

13. Process according to claim 1, wherein the particles comprise an internal electron donor compound.

14. Process according to claim 1, wherein the catalyst is a Ziegler-Natta catalyst.

15. Process according to claim 1, wherein the particles are obtainable by a process comprising the steps of:
   (a) contacting at least one compound of groups 1 to 3 of the periodic table with at least one compound selected from a transition metal compound of groups 4 to 10 of the periodic table or a compound of an actinide or lanthanide to form a reaction product in the presence of a solvent, leading to the formation of a liquid/liquid two-phase system comprising a catalyst phase and a solvent phase,
   (b) separating the two phases and adding an agent for generating said inclusions not comprising catalytically active sites to the catalyst phase,
   (c) forming a finely dispersed mixture of said agent and said catalyst phase,
   (d) adding the solvent phase to the finely dispersed mixture,
   (e) forming an emulsion of the finely dispersed mixture in the solvent phase, wherein the solvent phase represents the continuous phase and the finely dispersed mixture forms a dispersed phase, and (f) solidifying the dispersed phase.

16. Process according to claim 1, wherein the particles are obtainable by a process comprising the steps of:

(a) contacting, in the presence of an agent for generating the inclusions not comprising catalytically active sites, at least one compound of groups 1 to 3 of the periodic table with at least one compound selected from a transition metal compound of groups 4 to 10 of the periodic table or a compound of an actinide or lanthanide to form a reaction product in the presence of a solvent, leading to the formation of a liquid/liquid two-phase system comprising a catalyst phase and a solvent phase, (b) forming an emulsion comprising a catalyst phase comprising said agent and a solvent phase, wherein the solvent phase represents the continuous phase and the catalyst phase forms a dispersed phase, and (c) solidifying the dispersed phase.

17. Process according to any one of the claims, wherein the catalyst system comprises additionally co-catalyst(s) and/or external donor(s) and/or optionally activator(s).

18. Process according to claim 1, wherein the catalyst system is present in the first and second stage of the process.

19. Process according to claim 1, wherein the heterophasic propylene copolymer is non-sticky.

20. Process according to claim 1, wherein elastomeric copolymer content of the heterophasic propylene copolymer is at least 20.0 wt.-%.

21. Process according to claim 1, wherein a comonomer content of the heterophasic propylene copolymer is at least 15.0 wt.-%.

22. Process according to claim 1, wherein the first stage is carried out at a temperature of 40 to 110° C. and/or at a pressure of 20 to 80 bar.

23. Process according to claim 1, wherein the second stage is carried out at a temperature of 50 to 130° C. and/or at a pressure of 5 to 50 bar.

24. Heterophasic propylene copolymer comprising, a propylene polymer matrix, and an elastomeric propylene copolymer, wherein (a) the propylene polymer matrix is formed in a first stage in at least one slurry reactor and optionally in at least one gas phase reactor, and (b) the elastomeric propylene copolymer is formed in a second stage in at least one gas phase reactor by copolymerizing propylene with ethylene and/or with another a-olefin in the presence of said matrix, wherein the polymerization at least in the first stage is carried out in the presence of a catalyst system comprising a catalyst in form of solid particles, said particles (i) have a surface area of less than 20 $m^2/g$ (ii) comprise a transition metal compound which is selected from one of the groups 4 to 10 of the periodic table (IUPAC) or a compound of actinide or lanthanide, (iii) comprise a metal compound which is selected from one of the groups 1 to 3 of the periodic table (IUPAC), and (iv) comprise inclusions not comprising catalytically active sites.

25. Process according to claim 7, wherein the inclusions, in particular the solid material, have (has) a particle size of below 100 nm.

26. Process according to claim 1, wherein solid particles comprise not more than 1.0 to 30.0 wt.-%, inclusions being solid material.

27. Process according to claim 1, wherein elastomeric copolymer content of the heterophasic propylene copolymer is at least 25.0 wt.-%.

28. Process according to claim 1, wherein a comonomer content of the heterophasic propylene copolymer is at least 20.0 wt.-%.

29. Process according to claim 1, wherein a comonomer content of the heterophasic propylene copolymer is at least 25.0 wt.-%.

* * * * *